United States Patent [19]
Bruce et al.

[11] 3,849,053
[45] Nov. 19, 1974

[54] MOLD FOR FABRICATING THE HOUSING OF A DISPENSING VALVE FOR PRESSURIZED DISPENSERS

[75] Inventors: Roger K. Bruce, Mission Viejo; Werner Marhold, Huntington Beach; Cecil F. Adickes, Playa del Rey, all of Calif.

[73] Assignee: Sterigard Corporation, Santa Ana, Calif.

[22] Filed: July 2, 1973

[21] Appl. No.: 375,674

Related U.S. Application Data

[63] Continuation-in-part of Ser. No. 114,204, Feb. 10, 1971, Pat. No. 3,734,125.

[52] U.S. Cl............... 425/438, 249/63, 249/66, 425/441, 425/443, 425/468
[51] Int. Cl............... B29c 1/14, B29c 7/00
[58] Field of Search........... 425/249, 468, 330, 436, 425/438, 441; 249/64, 63, 66, 142, 145; 164/340, 397

[56] References Cited
UNITED STATES PATENTS
| | | | |
|---|---|---|---|
| 2,718,032 | 9/1955 | Harvey........................... | 425/249 X |
| 2,994,921 | 8/1961 | Hultgren...................... | 425/468 X |
| 3,193,890 | 7/1965 | Clary et al..................... | 249/145 X |
| 3,334,878 | 8/1967 | Sterner........................ | 249/145 X |
| 3,632,277 | 1/1972 | Stalter........................... | 249/66 X |

Primary Examiner—J. Spencer Overholser
Attorney, Agent, or Firm—Christie, Parker & Hale

[57] ABSTRACT

Upper and lower mold halves define the exterior surface of a housing for a dispensing valve, which has a barrel orthogonally disposed with respect to a base. A parting surface between the two mold halves passes through the longitudinal centerline of the base and then steps at a slight positive angle from a point on the barrel to a terminus of an external mounting flange of the barrel. The parting surface then continues perpendicular to the axis of the barrel parallel to the portion of the surface through the base. After the housing has been molded, the upper and lower mold halves are separated to pull core pins carried by them which define a bore of the barrel. After separation of the mold halves a core defining the interior of the base is pulled. The delayed pulling and the pulling of the base core are accomplished through lost motion and a ramp which forces the core to move at right angles to the axis of the barrel.

13 Claims, 5 Drawing Figures

MOLD FOR FABRICATING THE HOUSING OF A DISPENSING VALVE FOR PRESSURIZED DISPENSERS

CROSS REFERENCE TO RELATED APPLICATION

The present application is a continuation-in-part of U.S. Pat. application Ser. No. 114,204 filed Feb. 10, 1971, now U.S. Pat. No. 3,734,125.

BACKGROUND OF THE INVENTION

The present invention relates in general to the art of molding, and, more in particular, to the art of molding small parts rapidly and economically.

Pressurized dispensers are popular for storing and dispensing a variety of products. Examples of products are endless, but a range would include viscous cheeses and non-viscous medicants.

Pressurized dispensers have a dispensing valve for the selective dispensation of product. One of the most promising new dispensing valves has a barrel capping a base with the axis of the barrel being horizontal and the axis of the base being vertical. The barrel is communicated with the interior of the dispenser through the base. A valving mechanism within the barrel includes a plug which seats at a nozzle end of the barrel under the force of a compression spring between the plug and the rear closure cap on the barrel. An actuator is coupled to the plug by a stem extending through the rear closure cap. Pivotal movement of the actuator on the cap pulls the plug from the nozzle and allows product to pass around the plug and out the nozzle. The position of the barrel at right angles to the axis of the dispenser admits to having a pressure-sensitive, automatic venting capability in the valve with sealing at the nozzle. The safety venting is accomplished by having an area of the plug opposed by the compression spring see dispenser pressure. The horizontal barrel also facilitates sealing or valve closure in an area quite near the product outlet from the valve, typically at the nozzle, and valve assembly. Moreover, for economical production of a dispensing valve it has been found that assembly of the components of the valve from one end of the housing is considerably more economical than assembly from both ends of the housing. Ideally, the valve housing will be designed such that the parts which it contains can be inserted through one opening.

Dispensing valves for mass marketed pressurized dispensers obviously have to be very inexpensive. Orientation of the barrel at right angles to the base for consumer preference, valve closure at the nozzle, and such closure with a safety venting function present a severe problem in the economical production of dispenser valve housings. This problem is that the core pieces which define the hollow interiors of the housing must necessarily be at right angles to one another. More specifically, core pieces must define the bore of the barrel and the interior of the base. The bore of the barrel and the interior of the base are at right angles to one another. Consequently, the core pieces must be pulled from the molded part at right angles. Right angle core pulling complicates mold design and reduces the number of cavities for a given size mold base. When two cores at right angles to each other have their axes lying in a common parting plane, the mold is complicated because mold separation itself does not withdraw the cores from the molded part and additional means must be provided to withdraw the cores from the part.

The rear closure cap of the valve previously described snaps onto the rear of the barrel over an external mounting flange. Other forms of mounting, for example, threads, are too expensive and consume too much time in assembly. A flange and groove mounting of the rear cap in the barrel's bore with sufficient flange and groove depth to provide adequate interference results in an undercut which is too great for a simple core because material will be torn from the wall of the bore during core removal. Moreover, an interior flange and groove reduces the volume within the bore for the closure spring. The result is that an external mounting flange for the rear closure cap is necessary. Even with an external mounting flange, its extent to provide sufficient interference with the closure cap is too great to be provided by an undercut in the mold. Stated in different words, with the requisite sized flange, too much barrel material would have to be compressed with removal of the part from the mold if the flange were defined by an undercut.

SUMMARY OF THE INVENTION

The present invention provides a mold wherein two or more cores at angles to each other have at least one core pulled by mold separation and the parting surface between mold halves is stepped to prevent undercuts.

More in particular, the mold employs a parting surface of staggered parting planes connected by a transition parting plane. In relation to a valve housing made from the mold, the mold has a base parting plane containing the longitudinal axis of the base of the dispensing valve which extends completely through the base and slightly into the dispensing valve's barrel. A barrel parting plane is spaced from and parallel to the base parting plane at an interior shoulder of a closure cap mounting flange of the barrel of the valve. The base and barrel parting planes are offset from one another and both are perpendicular to the longitudinal axis of the barrel. The barrel parting plane terminates before any overlapping of the barrel parting plane with the base parting plane, and preferably such that the termini of the two planes, as measured parallel to them, are spaced apart. A third, transition parting plane connects the termini of the base and barrel parting planes. Viewed from the side of the parting planes, the transition plane and the base parting plane have an obtuse included angle, as does the barrel and transition plane. The intersection of the transition plane with the barrel parting plane and the base parting plane define two lines which are parallel to each other and at right angles to the longitudinal axes of the base and the barrel. With this arrangement of parting planes, a lower mold half defines the barrel exterior up to the external flange and between the transition plane and the top of the barrel. The external flange and that portion of the barrel below the transition plane are defined by the upper mold half. The upper mold half has no undercut to define any portion of the external mounting flange. Consequently, in the finished valve housing the external mounting flange does not completely circumscribe the barrel but instead extends only partly around the barrel horseshoe fashion. Core pins for the bore of the barrel are carried by the mold halves and, as such, are withdrawn from a molded housing with separation of the halves. This results in a large number of cavities for a given size mold base.

The interior of the base of the dispensing valve housing is hollow and a passage exists through the housing base into the bore of the barrel. The mold of the present invention provides the cores which define the hollow interior of the housing. One core is disposed at right angles to the longitudinal axis of the barrel and is drawn from the housing base along the longitudinal axis of the base. Preferably, the base core is drawn from the housing base after the mold halves have parted to protect a circumferential, exterior rib of the housing base and so that the base core can define an interior flange of the housing base and be pulled from the housing base without injury to the latter. This is preferably accomplished by having a float connection between the base core and means for raising the upper mold half to effect separation of the mold halves before drawing the base core. It is also preferred that the passage through the base and into the barrel be defined by a core pin which moves with the base core so that it withdraws from the passage with withdrawal of the base core from the base.

A specific form of the mold of the present invention contemplates an upper and a lower mold half having parting planes as described. A ramp having horizontal and vertical components is defined by blocks. The base core is carried by one of these blocks. A lost motion space between a flange of the core and the carrying block permits the block to ride up the ramp a given distance before the lost motion space is closed. Thereafter the flange is engaged by the block and the base core moves with the block. This provides for the separation of the upper and lower mold halves prior to the drawing of the base core. The core itself carries the core pin that defines the passage through the base and into the barrel. Preferably, a guide and stripper follows the vertical motion of the base core and resists the molded housing as the base core draws from it, thus stripping the housing.

These and other features, aspects and advantages of the present invention will become more apparent from the following description, appended claims and drawings.

DESCRIPTION OF THE PREFERRED EMBODIMENTS

Because an understanding of the dispensing valve fabricated with the mold of the present invention is helpful in understanding the mold itself, the valve will be briefly described.

Figure 1:
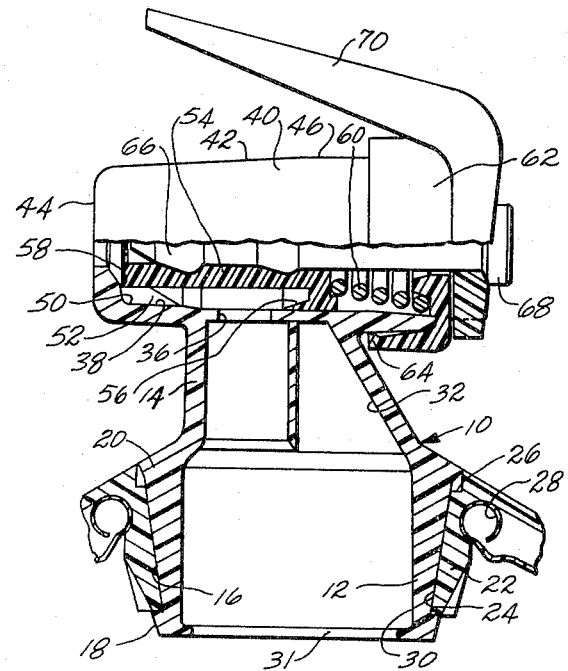
FIG. 1 is an elevational, partly half-sectional view of a dispensing valve for a pressurized dispenser made with the mold of the present invention.

With reference to FIG. 1, the dispensing valve includes a base 10. The base is defined by a plug 12 and a pedestal 14. The plug has an exterior tapered surface 16 which extends down to an external, circumferential flange 18. The plug flares out slightly at 20 at the top of the tapered surface. The plug cooperates with a lock ring 22 to mount the valve on a dispenser. The lock ring has an internal tapered surface 24 which tapers more rapidly than does the cooperating externally tapered surface of the plug. This provides interference between the plug and the lock ring, as is illustrated. An overtravel space 26 above the lock ring allows the plug to overtravel the lock ring to be sure that rib or flange 18 passes clear of the end of the lock ring. Pressure within the dispenser acts on the valve to raise it to the illustrated position, with rib 18 abutting against the bottom of the lock ring.

The plug exerts compressive force on the lock ring. This force forces the lock ring into tight sealing engagement with a bead or curl 28 of the dispenser.

The interior of the plug is hollow and is defined by a generally right cylindrical wall 30. An internal, circumferential flange 31 at the base of wall 30 provides a mount for some desired appendage to the valve, for example, a valve extension. Wall 30 merges into a narrowing wall 32 of the hollow interior of the pedestal. A valve extension mount 34 within the pedestal is hollow and opens into a hole 36 into a bore 38 of a barrel 40. The valve extension mount receives a valve extension or a choke.

Figure 4:
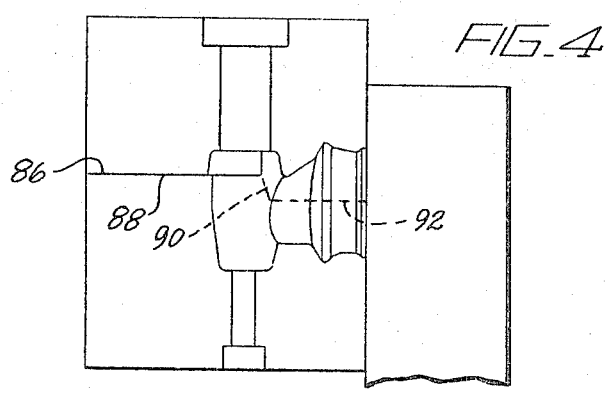
FIG. 4 is a partial view primarily illustrating the staggered parting planes of the mold of the previous Figures.

The barrel has an externally tapered surface 42 from a nozzle end 44 to a right cylindrical surface 46. As is seen in FIG. 4, an external mounting flange 48 of the valve housing extends partly around the rear of the barrel but terminates at a point which in elevation and relative to the base is above the uppermost junction of the barrel and the pedestal.

With reference again to FIG. 1, the bore of the barrel is tapered at 50 and has a guide 52 for a plug 54 of the valving mechanism. The bore continues from the nozzle end to open into passage 36 to the base of the valve. Rearwardly of section 50 and in the area occupied by a cup seal 56, the bore is right cylindrical. The purpose of right cylindricality in this area is for the cup seal to always sufficiently engage the wall of the bore and seal against product passage past it, notwithstanding the position of the cup seal in the bore.

The plug is biased to a closed position aginst a seat 58 at the nozzle end of the barrel by a compression spring 60. The compression spring acts between the plug and a rear closure cap 62. Rear closure cap 62 has an annular, internally extending flange 64 which snaps over mounting flange 48 of the barrel to keep the rear closure cap in place. The plug is carried by a valve stem 66 which extends longitudinally along the axis of the barrel and out the rear of the closure cap. The stem is headed at 68. An actuator 70 is received by the stem and bears against the head and the top of the closure cap. Depression of the actuator counterclockwise pivots the actuator on the closure cap and acts on the head of the stem to pull the plug away from its seat. This obviously allows product to leave the valve.

The valve housing thus has a barrel disposed at right angles to the base and which extends beyond the base's horizontal limits. The housing also has an external mounting flange that has an axis at right angles to an external locking rib and an internal mounting flange. Both the barrel and the base are hollow.

The mold of the present invention readily and economically fabricates the valve of FIG. 1.

Figure 2:
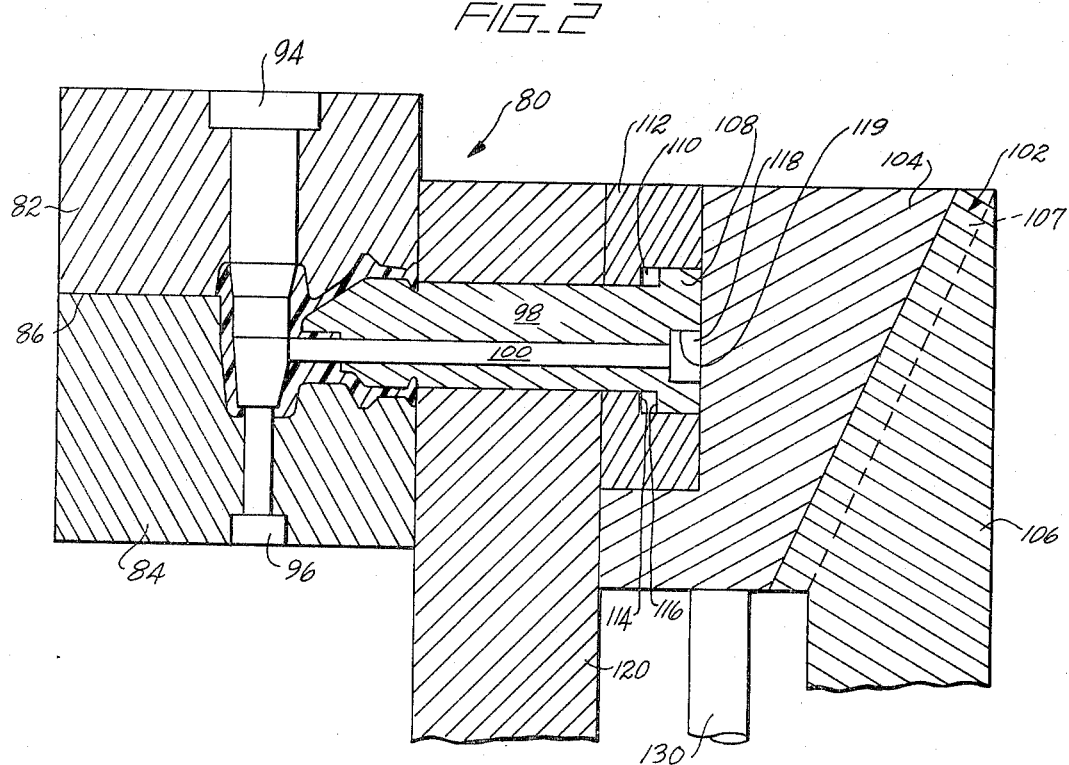
FIG. 2 is an elevational, sectional view of a mold in accordance with the present invention taken in a plane which contains both the base longitudinal and the barrel longitudinal axes of the dispensing valve of FIG. 1.
Figure 3:
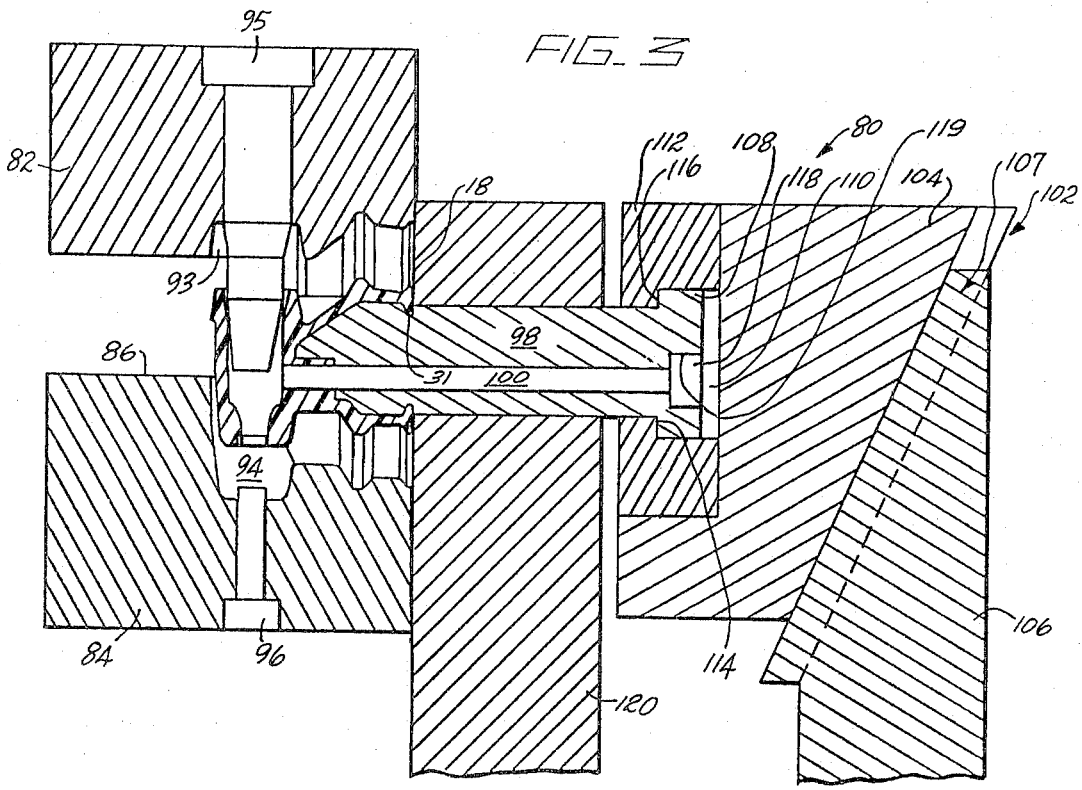
FIG. 3 shows the mold of FIG. 2 in the process of separation.

With reference to FIGS. 2 and 3 in particular, a mold 80 in accordance with the present invention is illustrated. The mold has an upper mold half 82 and a lower mold half 84. A parting surface 86, seen to best effect in FIG. 4, separates the two mold halves. The parting surface has a barrel parting plane 88, a transition parting plane 90, and a base parting plane 92. The barrel and base parting planes are parallel to each other. The transition parting plane is obtuse to both the barrel and base parting planes. This results in a positive angle for the accurate registration of the upper and lower mold halves upon mold closure and the avoidance of any undercuts. The intersection between the transition parting plane and the barrel and base parting planes defines two parallel lines which are normal to the axes of both the barrel and base of the dispensing valve housing.

As is seen in FIG. 3, the upper and lower mold halves define the exterior of the valve housing with cavities 93 and 94, respectively.

A core pin 95 is anchored in the upper mold half and defines the bore of the barrel of the dispensing valve. As such, the core pin has, alternately, a tapered surface at the rear end of the barrel's bore, a right cylindrical surface intermediate the barrel's bore and in the area of cup seal travel, and a tapered surface at the nozzle end of the barrel past the zone where the cup seal travels. A second core pin 96 is carried by the lower mold half and defines the nozzle of the valve. Core pin 96 is coaxial with core pin 95 and, with the mold closed, it is telescoped into core pin 95. Both of the core pins are anchored in their respective mold halves and will pull from the molded part with the separation of the mold halves.

The interior of the base of the valve is defined by a core 98. A core pin 100 within core 98 defines the passage through the base and into the bore of the barrel. Core 98 defines annular internal flange 31. The outside of the base has external, circumferential rib 18 and flared section 20. The outside of the base also contracts into pedestal 14 to meet the barrel. Because of these surface features of the base, the mold halves have to separate where there would be no mold undercuts.

Obviously, because of the presence of flange 31 and, moreover, to facilitate the pulling of core pins 95 and 96 from a molded valve housing with the separation of mold halves 82 and 84, it is necessary to keep the valve housing in its position as molded during separation of the mold halves. That is, it is necessary to keep the molded valve housing from going with one or the other of the mold halves so that proper mold separation and part freeing occur. Core 98 provides these functions by holding the valve housing and allowing the mold halves to separate from it. Because of this it is necessary that core 98 not pull from the molded part until mold half separation takes place. Moreover, when core 98 is pulled it must be pulled parallel to the axis of the base and at the right angle to the direction of separation of the mold halves.

The delay in stripping core 98 and core pin 100 from the base of a molded valve housing is effected by a float between the core and core pin and the mechanism which imparts movement to them. Specifically, a ramp 102, consisting of a following block 104 and a base block 106, is responsible for imparting both vertical and horizontal motion to core 98. The blocks are held together through a pintle and mortise type joint 107. An annular, external flange 108 of core 98 is in a cooperating recess 110 of a member 112. Member 112 is secured to block 104. Recess 110 in the horizontal is longer than the horizontal span of flange 108. An interior shoulder 114 of member 112 is disposed to engage a cooperating interior shoulder 116 of flange 108 after the excess horizontal depth of the recess over that of the flange has been taken up. Thus, as can be seen in FIG. 2, there is a space to the left of flange 108 which must be taken up before core 98 follows the horizontal motion of block 104. This space has been taken up in FIG. 3 and core 98 will begin to follow the horizontal motion of block 104. Core pin 100 is attached to core 98. Core pin 100 has a head 118 in a recess 119 of core 98. Interior shoulders of head 118 and recess 119 abut so that core pin 100 is pulled with core 98.

Figure 5:
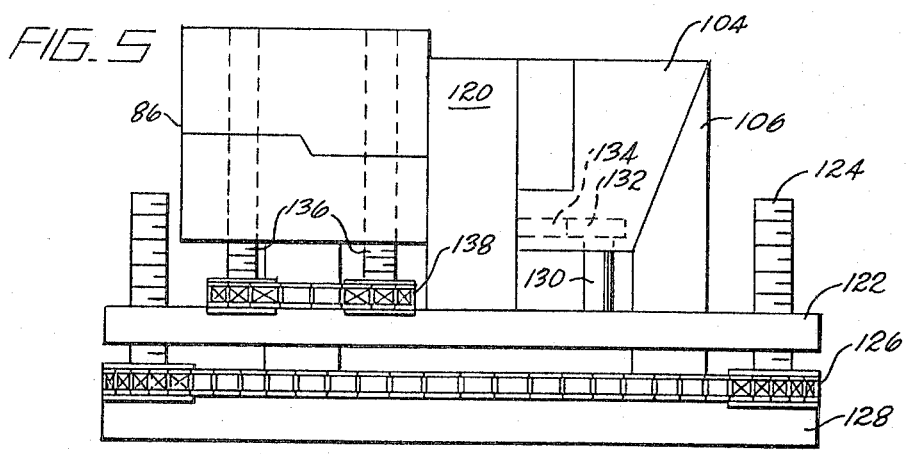
FIG. 5 is a generalized view showing a typical mechanism for separating the mold halves and pulling the base core and core pin.

In the mold, upper mold half 82 moves vertically relative to lower mold half 84 during the opening of the mold. Core 98 and core pin 100 also move vertically with respect to the lower mold half. A guide and stripper 120 carries core 98 vertically but allows the core to move horizontally relative to it. Guide and stripper 120 moves at the same rate and over the same vertical distance as does block 104 to maintain the horizontal orientation of core 98. Movement of the various components of the part is effected through ejection shafts shown to best effect in FIG. 5. A table 122 is driven vertically by rotating screws 124. The screws in turn are driven in rotation by a drive, as drive chain 126 and sprockets, and a motor, not shown. The screws are rotatably mounted in a base plate 128. Block 106 is anchored to the base plate, as is lower mold half 84. Ejection shafts 130 secured to table 122 act on block 104. To accommodate horizontal motion of the block, heads 132 of ejection shafts 130 are received in slotted recesses 134 of the block. Ejection shafts 136 secured to table 122 act on upper mold half 82 to impart to it a greater degree of vertical motion than imparted to block 104. Guide and stripper 120 is also secured to table 122 for vertical movement with the table.

The ejection shafts 136 of upper mold half 82 are drive screws driven by a drive 138 which consists of a chain and socket arrangement and a motor. This drive is carried by table 122 so that a greater amount of vertical lifting of the upper mold half is effected than the lifting produced by table 122 alone. Thus when it is time to remove a molded part from the mold, table 122 is elevated by drive 126 to raise guide and stripper 120 and block 104. During this movement, block 104 will traverse both vertically and horizontally to take up the lost motion between it and the core. Drive 138 will produce an accelerated rate of lifting of upper mold half 82 in comparison with the vertical lift of table 122 to get separation of the upper mold half from the molded dispensing valve housing (see FIG. 3).

When the lost motion between core 98 and block 104 has been taken up, core 98 will pull from the molded part. At this point, guide and stripper 120 acts as a stripper by providing bearing for the molded part against the horizontal force imparted to it by the drawing of core 98. Flange 31 of the molded part will not tear, for the part will expand to free the flange and has room to do so by virtue of the separation of the upper and lower mold halves from the external surface of the valve housing base. As core 98 is drawn from the part, core pin 100 follows so that it too is pulled from a molded part.

The mold preferably has a gate to the top of the barrel intermediate its ends. Vents can be provided where convenient.

The present invention has been described with reference to a certain preferred embodiment. The spirit and scope of the appended claims should not, however, necessarily be limited to the foregoing description.

What is claimed is:

1. An improved mold for the fabrication of a dispensing valve housing having a barrel and a base, the barrel having a bore and the base having a hollow interior, the longitudinal axes of the bore and the barrel being at right angles to one another, the barrel having an external mounting flange at a rear end thereof, the mold comprising:
   a. an upper and a lower mold half having mold cavities defining the external surface of the dispensing valve housing;
   b. a core pin carried by the upper mold half and defining the bore of the barrel;
   c. means for raising the upper mold half relative to the lower mold half to separate the upper mold half from the housing;
   d. a base core for defining the hollow interior of the base;
   e. means for raising the core relative to the lower mold half simultaneously with the raising of the upper mold half and at a slower rate to separate the lower mold half from the housing at substantially the same time that the upper mold half separates from the housing;
   f. means for drawing the core from the base after the upper mold half and its carried core pin are raised from the lower mold half; and
   g. a parting surface between the upper and lower mold halves defined by a barrel parting plane perpendicular to the axis of the barrel and extending to a terminus on the barrel of the barrel's external flange, a base parting plane extending parallel to the barrel parting plane and containing the base's longitudinal axis, the base parting plane terminating in the barrel at a line measuring parallel to the axis of the base, the base parting plane termination line extending no further than the terminus of the barrel parting plane in the barrel, and a transition plane connecting the base and barrel parting planes.

2. The improvement claimed in claim 1 wherein the transition parting plane joins the barrel parting plane and base parting plane along two parallel lines which extend at right angles to both the longitudinal axes of the base and the barrel.

3. The improvement claimed in claim 2 wherein the drawing means includes a first block, a second block, a ramp between the two blocks and defining a translational path for the second block having both vertical and horizontal components, and means for translating the second block on the path.

4. The improvement claimed in claim 3 wherein
   a. stripper means is included to strip the housing from the core upon horizontal movement of the core; and
   b. the drawing means includes float means between the second block and the core to effect horizontal movement of the core after a predetermined amount of vertical movement of the second block, whereby the mold halves separate from the housing before the core moves horizontally and is stripped from the housing.

5. The improvement claimed in claim 4 including a core pin for defining a passage through the base and into the barrel, the core pin being carried by the base core.

6. An improved mold for the fabrication by molding of a dispenser valve housing, the housing having a barrel and a base with axes at right angles to each other, an axial bore through the barrel, a hollow, axial interior of the base, an interior circumferential flange in the base interior at a right angle to the axis of the base, and an external mounting flange on the barrel partly extending circumferentially about the barrel to a terminus no higher in elevation than the terminus of the base of the barrel, the improvement comprising:
   a. an upper and a lower mold half having cavities defining the external surface of the dispensing valve housing and a parting surface defined by:
      i. a barrel parting plane perpendicular to the axis of the barrel at the longitudinal inside boundary of the external flange, and terminating in the barrel,
      ii. a base parting plane parallel to the barrel parting plane and extending through the base into the barrel, and
      iii. a transition parting plane connecting the two other parting planes;
   b. a core pin carried by the upper mold half and defining the bore of the barrel;
   c. a core pin carried by the lower mold half and defining a nozzle into the bore of the barrel;
   d. means for elevating the upper mold half with respect to the lower mold half;
   e. a base core disposed for horizontal movement with respect to the upper and lower mold halves and defining the hollow interior of the base of the dispensing valve housing;
   f. guide and stripper means carrying the base core and for stripping the dispensing valve housing from the base core upon horizontal movement of the latter;
   g. a first block, a second block and a ramp defined by the two blocks, the second block being translationally disposed on the ramp to effect, upon being raised, both vertical and horizontal motion with respect to the longitudinal axis of the barrel taken as the vertical;
   h. means coupling the second block to the base core to effect a predetermined amount of vertical movement of the base core with the second block before horizontal movement of the base core with the second block and to thereafter effect horizontal movement of the base core; and
   i. means for raising the second block and the guide and stripper at the same vertical rate simultaneously with and at a slower vertical rate than the upper mold half for the separation of the dispensing valve housing from the lower mold half while the housing is being separated from the upper mold half and for effecting horizontal movement of the base core after the predetermined amount of vertical movement thereof for the stripping of the dispensing valve housing therefrom.

7. The improvement claimed in claim 6 wherein the inside angles between the transition parting plane and the barrel and base parting planes are both obtuse.

8. The improvement claimed in claim 7 wherein the guide and stripper means is disposed to bear on the bottom of the base of the valve housing to strip the housing from the base core upon horizontal movement of the core.

9. The improvement claimed in claim 8 including a core pin carried by the base core for defining a passage between the base and the bore of the barrel.

10. The improvement claimed in claim 7 wherein the coupling means between the second block and the base core includes means defining a horizontal float between the second block and the base core.

11. The improvement claimed in claim 10 wherein the inside angles between the transition parting plane and the barrel and base parting planes are both obtuse.

12. The improvement claimed in claim 10 including a core pin carried by the base core for defining a passage between the base and the barrel bore.

13. The improvement claimed in claim 10 wherein the guide and stripper means is disposed to bear on the bottom of the base of a molded valve housing to strip the housing from the base core upon horizontal movement of the core.

* * * * *